United States Patent Office 3,563,801
Patented Feb. 16, 1971

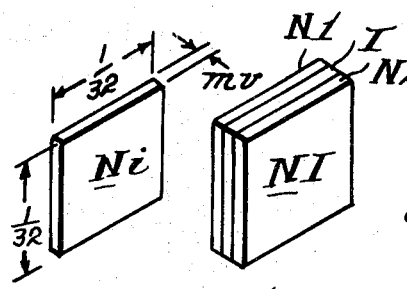
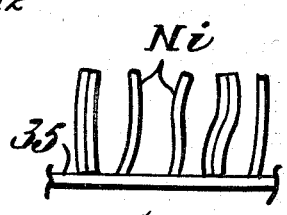
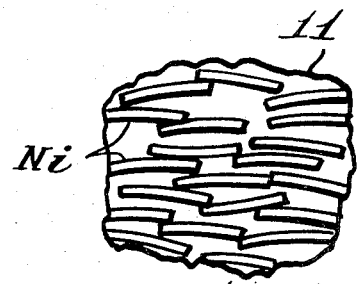
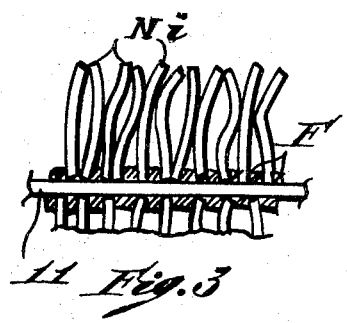
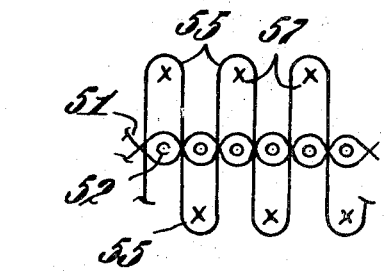
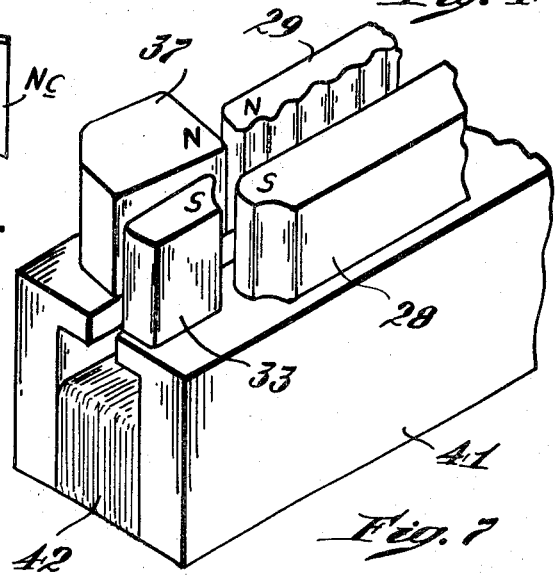
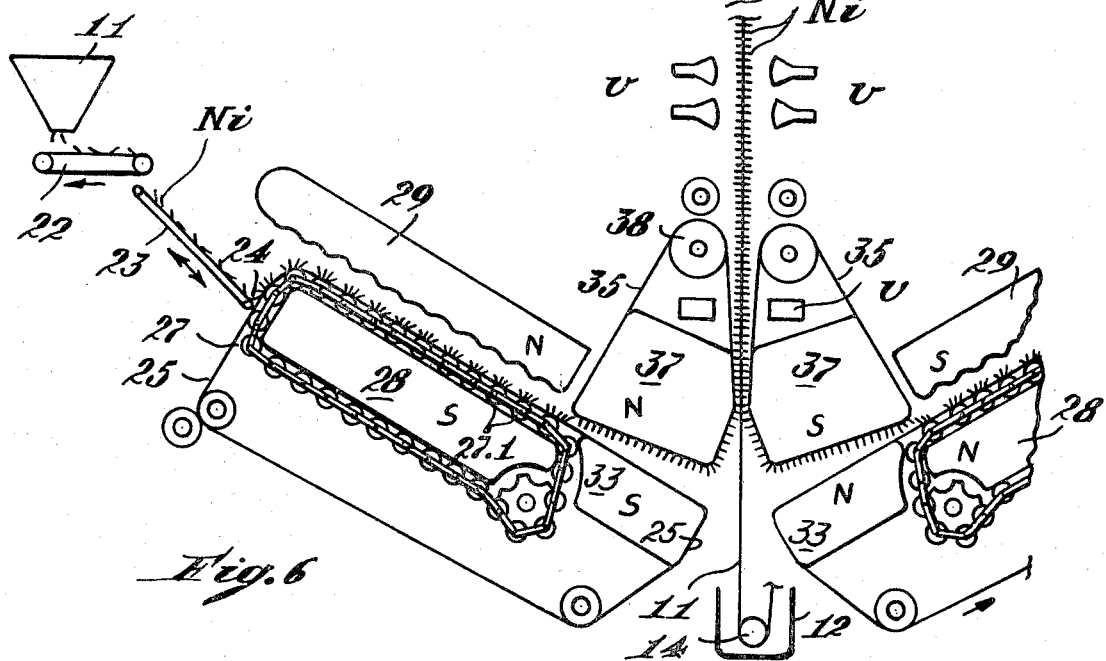

3,563,801
FLOCKED PLATE STRUCTURE FOR ELECTRIC BATTERIES
Irvin W. Cox, East Acton, Mass., assignor to Cambridge Thermionic Corporation, Cambridge, Mass., a corporation of Massachusetts
Filed Nov. 20, 1969, Ser. No. 878,434
Int. Cl. H01m 35/04
U.S. Cl. 136—64         19 Claims

ABSTRACT OF THE DISCLOSURE

A conductive metal strip for alkaline batteries carries an effectively ordered array of extremely thin, square nickel (or nickel plated iron) flakes stacked approximately normal to and transversely of the strip with their edges approximately parallel, and with one edge of each flake conductively joined to the strip by a sintered nickel fillet. The flakes are slightly separated by the mode of fabrication and by deviations from exactly normal and transverse position on the strip, and from exact flatness. These deviations are so small as compared to the generally normal and transverse positions and the flatness of the flakes, that they provide essentially regular interstices with optimal surface area of active material and accessibility thereof to electrolyte, and minimal volume and conductive length of supporting material.

A suitable technique of fabricating a flocked strip by way of magnetic stacking of flakes on belts and finally on the strip, traveling at different speeds, is described.

BACKGROUND OF THE INVENTION

Field of the invention

The invention relates to textured plates for alkaline electric secondary batteries, with the plate surface enlarged by supporting elements for the active material applied thereto.

Description of the prior art

While existing batteries of various constructions are considerably lighter than lead batteries, they have so far not attained optimal weight characteristics compatible with satisfactory performance. This is largely due to the presence in existing plate constructions of supporting elements which are not actually necessary either for the proper electrochemical or mechanical functioning of a battery. The presence of such unnecessary plate material is caused by its random distribution, with irregular supporting elements irregularly distributed on the support and irregularly, and often insecurely, joined to each other and to the support. This reduces the active surface, introduces surplus supporting structure, unpredictable structure deviations and irregular and flow impeding interstices for the electrolyte. The irregular interstices cause varying utilization of active material due to distortion of the supporting surface with cycling. Long, obstructed, and also serial current and electrolyte paths increase internal resistance. Also, the random distribution and assembly of the fine structure of such plates makes them inherently weak mechanically and requires even more bulk if ruggedness is desired. Also, the manufacturing techniques of such structures are a good deal uncontrollable.

In the particular field of nickel cadmium batteries, these were originally constructed similar to the Edison nickel iron batteries, with tubular pockets carrying granular active material. Apart from other defects this construction is unsuitable for modern continuous production. Sintered, and often subsequently compressed, plates have then been developed and these are fairly well suited for mass production but not as porous as might be desired. They provide only a limited surface area for carrying the active material with which the plates are subsequently impregnated and the electrolyte has only limited access. Furthermore, conventionally sintered bodies are rather fragile if not supported by fairly rigid plates, and hence ill-suited for techniques involving strips which have to be bent for continuous treatment.

In the course of developing his nickel iron batteries, Edison proposed the use of nickel "flakes" which were loaded into tubes in layers interspersed with nickel hydrate and, when tamped down, gave the desired conducting, but quite irregular, structure. These extremely thin small flakes were manufactured by alternately depositing nickel and copper layers on drums, each layer approximately .00004" thick. A laminate of about 125 films of copper and 125 films of nickel was removed from the drums, cut into pieces about $\frac{1}{16}$ inch square, and put into a solution where the copper was dissolved leaving thin platelets of pure metallic nickel. After washing and drying, these so-called nickel "snow flakes" were mechanically loaded into the tubes of the battery plates. This technique is described in several patents such as Nos. 1,526,320, 1,559,562 and 1,417,464 to Thomas A. Edison and it is also described in the literature, compare for example "The Edison Storage Battery," P.B. 42771 PPG–10, and N.E.A. Monograph III, by the Technical Staff of Edison Storage Battery (1926). These flakes, irregularly distributed in their tubes, did not solve the problem of surplus supporting material.

The present inventor, realizing the drawbacks of non-oriented supporting elements, initially made an analytical study of nickel filaments welded to a nickel sheet, resulting in so-called nickel velvet. This provided an oriented structure with less than 5% nickel volume in relation to the active material. Such "velvet" plates, however, are not practical to manufacture at present but their parameters can be evaluated exactly and sort of "existence theorem" proved. Also if it were possible to produce nickel whisker growth on preactivated sites on nickel foil, such plates might be practical.

The present invention is based on the concept of orienting on a support some finely divided regularly shaped supporting material that has been readily available for some time, although not for building up a regular support structure, such as, the above-described nickel flakes proposed by Edison for stuffing into pockets or tubes in random fashion, with the above outlined drawbacks of a random structure. Thus, while the Edison flakes were never used or described for purposes of the present invention, they provide a favorable and readily available structural component therefor. Such flakes, however, are, according to the invention, preferably $\frac{1}{32}$" square rather than Edison's $\frac{1}{16}$" squares, in order to give on a 1 mil support material plates approximately .063" thick, with flock on both sides. These $\frac{1}{32}$" square platelets can be manufactured in less than one-fourth the time required for the Edison flakes because the distance from the edges during chemical etching is only $\frac{1}{64}$" and the rate much faster. In addition, a system of alternate air stirring and electric discharge percussion will cause pumping of the etchant and shorten the time of separation of the nickel and copper layers. The smaller flakes are more rugged, less ragged, and flatter, so that when oriented according to the invention (so to speak "carded" by magnetic "combs" in the form of roller chains) they line up to meet the conditions as to parallelism, spacing and perpendicularity to the carrier foil.

SUMMARY OF THE INVENTION

In its principal aspects the invention is characterized by the application of flock means, preferably effectively rectangular square nickel flakes (of nominal thickness .00004") in a nearly regular oriented pattern, to a carrier means or support (such as a .001" nickel plate or strip) to which they are attached by a metal (such as nickel) filled providing conductive connection of the flakes. The carrier means is provided with conventional highly conductive terminal means. Thus, a flocked plate for electric batteries according to the invention comprises a thin conductive supporting carrier sheet (.001" nickel for example), an array of electroyltically effective platelets or flakes which have at least one effectively straight supporting edge and which are bonded to one or both surfaces of the carrier sheet, each with the supporting edge at that surface. The flakes are bonded in such a manner that the supporting edges are approximately codirectional and the flakes project approximately normal from the surface at predetermined distances from each other which provide optimal channels for the electroyte and optimally large surface for the very thin films of the active battery material. These distances are determined and provided by the manner of plate fabrication subject to slight modification by unavoidable deviations from flake flatness, and by deviations from perfect parallelicity and from normal extension from the supporting surface. The flakes are with their straight supporting edge bonded to the supporting surface by a conducting juncture such as a nickel fillet formed by sintering from a nickel containing slurry film applied to the carrier strip, and subsequently dried and reduced to nickel, cementing the platelets to the suport on each face.

A suitable technique according to the invention, now preferred from among others, involves depositing the loose random flakes of nickel on a non-magnetic conveyor belt, under which a magnetized roller chain passes at high speed. The concentrated fields at the lines of roller contact with the belt act to pick up groups of the nickel flakes and with the aid of auxiliary expedients, according to the invention, line them up at right angle to the belt motion, with their outer ends at a controllable divergence which prevents close crowding of the flock. On the roller chain breaking away sharply from the non-magnetic belt, the clumps of diverging flakes are transferred to another non-magnetic belt which travels through an opposite field, at the same low speed as the slurry coated carrier strip. The divergent flakes hop, serially closer on the second belt, with their outer ends swinging in the second field to provide space for the next flake. This magnetic "cowlick" insures tangle-free transfer from the first to the second belt, and by cotrolling the speeds of belts and roller chain the space between flakes can be varied at will.

In another embodiment of the invention, "river and tributary" battery plates are fabricated by a weaving technique resulting in a metallic warp and weft structure supporting, terry cloth fashion, metallic, electrolytically active, surfaces in the form of filaments or slivers which are conductively connected to the supporting woven structure.

Object of the invention is, in general terms, to adapt the structure of an alkaline storage battery to the optimum utilization of the theoretical ability of the elecrochemically active material such as $2Ni(OH)_2$, $Cd(OH)_2$, by providing a battery plate built up from flakes in a nearly regular pattern representing a supporting metallic nickel structure of 5% or less the total plate volume, the rest being active electrode material and electrolyte. The configuration of this structure is effectively predeterminable, and permits control of all battery parameters such as terminal resistance, grid resistance, active material film resistance, excepting only the open circuit voltage, and thus permits special design for special purposes. The utility of the invention is demonstrated by the fact that the bulk volume of the supporting flakes with optimal interstices before the introducing of the active material can be made as low as .035 cc. per cc., providing a nickel cadmium sealed cell capacity of greater than 30 ampere hours or 36 watt hours per pound of battery as compared with the heretofore obtainable 10 ampere hours or 12 watt hours per pound. The invention is applicable to alkaline cells in general and results in much lighter nonsealed alkaline cells generally, including nickel, iron, silver, and zinc cells.

More specifically, objects of the invention are:

To decrease the ratio of bulk of supporting structure of an alkaline battery relative to that of active material;

To form and dispose the supporting structure such that the coefficient of utilization of the active material does not change with cycling of the electrolyte, and with time during which volume and location of active material might change, so that the inclusion of excess material can be eliminated in a practical cell;

To provide a supporting grid coated with an active material structure which conducts in optimally short paths, without discontinuities or loops, comparable to a "river and tributaries" pattern, the internal resistance of the battery being reduced by this pattern such that each element of the cell contributes to internal resistance in a manner which is subject to definite control;

To provide battery electrodes wherein the active material is a uniformly thin film a few, such as 10 to 12, microns thick with one surface in metallic contact with the metal grid of the plate and the other in liquid contact with the electrolyte with minimally short electrolytic paths within each electrode and between positive and negative materials;

To provide as an especially advantageous characteristic thin layers of active material which are of much higher resistance than metals, as compared with the Edison positive plates whose layers are over ten times as thick and without good contact or definite access to electrolyte;

To provide electrodes wherein volume changes with cycling of active materials occur in the liquid electrolyte space without stressing the electrodes, such that the heretofore attainable coefficient of utilization is materially increased;

To produce a cell with the advantages of an all nickel structure which still uses less total nickel than existing commercial cells of the same capacity which use nickel plated iron carrier strips; and To provide an efficient technique for manufacturing a flocked plate of this type.

Other objects and advantages will be apparent from the following description of specific embodiments of the flocked plate and a technique of fabricating it.

BRIEF DESCRIPTION OF THE DRAWING

FIG. 1 is an isometric view of a nickel flake or platelet such as used for purposes of the present invention;

FIG. 2 is a view similar to FIG. 1 but illustrating the laminated construction with an iron core, according to the invention;

FIG. 3 is a fragmentary longitudinal section through a finished plate structure according to the invention;

FIG. 4 is a fragmentary top view of the structure according to FIG. 3;

FIG. 5 is a view similar to FIG. 1, of a crimped flake;

FIG. 6 is a schematic side elevation of apparatus for fabricating flaked plate structures according to the invention;

FIG. 7 is an isometric view of the magnetic circuit of FIG. 6;

FIG. 8 is a cross section through belt 35 of FIG. 6, with the flakes magnetically held thereon; and FIG. 9 is a schematic cross section through a woven plate element according to a modification of the invention.

DESCRIPTION OF THE PREFERRED EMBODIMENTS

FIG. 1 illustrates a flock element, here a nickel flake N$i$ made according to the above-outlined Edison technique of the prior art, with the dimensions utilized for the present invention, namely $\frac{1}{32}$ of an inch square and about .00004" thick.

FIG. 2 illustrates the nickel iron laminate NI developed according to the present invention where I is an iron foil plated on each side with a nickel layer, N1 and N2, respectively. The dimensions are essentially the same as those of FIG. 1. These composite flakes are fabricated by plating on a drum, according to the Edison technique, alternate copper, nickel, iron, nickel, copper, nickel, iron, nickel, copper, etc. layers and, as outlined above, dissolving the copper after the electroplated laminate has been cut into small squares, so that the nickel-iron-nickel flake NI remains.

A complete battery plate structure, prior to impregnation, is illustrated in FIGS. 3 and 4. A carrier means, here a supporting strip or sheet which can be perforated, is indicated at 11. It will be understood that the supporting strip or sheet is provided with highly conductive terminal means of known construction. The flakes N$i$ or NI are stacked as closely as desired on both sides of the support 11 to which they are joined by sintered nickel fillets F obtained in the manner to be described hereinbelow. The irregularities of flake shape and orientation are rather grossly exaggerated in FIGS. 3, 4 and 9, but with the predetermined regular distances indicated.

These predeterminable distances of the surfaces of opposite flankes, and the above-mentioned deviations from absolute flatness and absolutely regular flake distribution, provide the required minimal and yet mutually completely connected interstices or channels. The distribution irregularities stem from the available techniques of assembling flakes and strip which include magnetic orientation and pressing an edge of each flake into a film of slurry, whereby the edges are not exactly parallel on, and the flakes not exactly normal to, the strip. It should be kept in mind that the microscopical irregularities which provide the interstitial spaces are of a lower order of magnitude than the comparatively macroscopically regular distribution and orientation pattern of the flakes, which is essential for the purposes of the invention. The following sample calculation incorporates the above embodiment and also indicates the wide scope of possible modifications.

For this calculation, 500 flakes/inch are assumed, with .002" between centers $\frac{1}{32}$" square, and .00004" thick, bonded to the carrier strip conductively and mechanically to the equal of the flake cross section. From these data it is simple to calculate: (1) the total cross section of flake, (2) the total flake surface area, (3) its contribution to internal resistance, (4) the porosity of the plaque, and (5) the thickness of the active material at a given percentage of fill. Each of these five items can be recalculated for a given change in any one of them. In the above example, the porosity is 96.5%, and the thickness of $Ni(OH)_2$ at 50% fill is .0005". If the flakes were twice as thick the porosity would be 94.6%.

Square flakes are preferred because most convenient in manufacture, but it should be noted that, while the flakes obtained in accordance with the Edison technique will have four straight edges, it is only necessary that one edge be reasonably straight.

If the above described secondary irregularities should not be sufficient for a given purpose, then deviations from the flake flatness can be introduced such as by crimping as indicated in FIG. 5 showing a crimped flake Nc. It will be evident that the crimp channels c will in the final structure run in different directions, especially if they are initially applied at different angles to respective flake edges. Instead of crimping them, the flakes can be otherwise shaped by appropriately forming the electroplating drum, such as with dimples or similar more or less regular secondary deviations from flatness. In general this will not be necessary. Also, regular cropped filaments of nickel .0003" in diameter and $\frac{1}{32}$" long can be used instead of the flakes, for application by apparatus such as, for example, similar to the one described below with reference to FIGS. 6 and 7.

The flocking machine schematically illustrated in FIG. 6 has identical right and left-hand sections, one on each side of the carrier strip 11; for reasons of space only the central portion of the right-hand section is shown. Thus, wherever certain elements described with reference to FIG. 6 are mentioned in the singular, it should be understood that they occur on both sides, and they are similarly numbered. The magnetic segments, however, are of opposite polarity, as indicated. A practically feasible magnetic circuit is illustrated in FIG. 7 wherein the pole segment faces are labeled similar as in FIG. 6, namely 27, 37 for the two north poles and 28, 33 for the two south poles. A yoke 41 with magnetizing coil 42 is indicated in FIG. 7.

If desired, ultrasonic beaters can be added as indicated at U of FIG. 6. The provisions for drying the strip can include infrared radiation sources directly at the emerging strip, as indicated at H of FIG. 6. This strip, for example, can be of .001" x 2" nickel with closely placed small perforations. This carries a thin film containing compounds of nickel such as hydroxide, oxide, formate, or other metallic compounds, suspended in a liquid binder such as dissolved urea formaldehyde which produces carbon monoxide when sintered in hydrogen, reducing the nickel or other metallic compound to an extremely active metallic deposit which bonds the flakes at their edges of contact to the perforated nickel carrier strip. The application of the binder to the strip is indicated by trough 12 into which strip 11 initially dips. The strip 11 is transported at a suitable speed (for example 10" per minute) by conventional means. Application of 500 rows of flakes per inch would thus require 5000 rows of flakes per minute and if each roller carries ten rows, 500 rollers must pass per minute. At two rollers per inch this would be 250 inches per minute.

Hopper 21, of FIG. 6 contains the randomly loose flakes of nickel previously described. Suitable light agitation deposits a thin layer of these on conveyor 22, which drops them individually on the sloping plate 23 vibrating in the direction of the double arrow, where they move downward, practically coplanar, meeting edge on the thin receiving end of a transverse closure strip 24 of non-magnetic metal which is in contact with a thin plastic conveyor belt 25.

Under the belt 25 passes a roller chain 27 at high speed. The soft iron rollers 27.1 of this chain move on magnet pole pieces 28, and act as cylindrical magnetic lenses to concentrate the field at the lines of contact with the thin plastic belt 25. A suitable speed for the non-magnetic belt 25 is, by way of example, 25 inches per minute, one-tenth that of the roller chain 27. This enables the rollers 27.1 to pick up groups of the nickel flakes and drag them along over the non-magnetic belt 25 which is moving at much lower speed. Shallow serrations on the oppositely located magnetic poles 29 cause these groups of flakes to rock backwards and forwards as they are dragged along at several times the speed of the plastic belt depending on whether the nearest portion of pole 29 is backward or ahead. At the same time the flake edges in contact with the non-magnetic plastic belt 25 tend to line up at right angle to the motion, with their outer ends slighly divergent. This divergence is controllable and is one of the factors which prevent final close crowding of the flock. The magnet pole segment 28 and an additional segment 33 are separated from each other by a channel through which the chain 27 breaks away sharply from the plastic belt 25, just as this approaches a third segment 37 of like polarity from which it is also separated by a channel.

Another plastic belt 35 passes around a fourth segment 37 with pincher roll 38. The belt 35 travels at the same low speed as the slurry coated carrier strip 11. As each iron roller 27.1 of roller chain 27 approaches the corner of pole 37, covered by slowly moving belt 35, the first belt 25 moves away from the roller and the clump of diverging flakes find themselves serially closer to the opposite magnetic pole 37 and hop to belt 35. Immediately their outer ends swing to the nearest opposite pole. This provides space for the next flake as it hops in its turn. This arrangement which may be called a magnetic "cowlick" insures tangle-free transfer from belt 25 to belt 35. The approximate arrangement of the flakes on belt 35 is indicated in FIG. 8. It is evident that by controlling the speeds of the belts and chains and the magnetic divergence, the space between flakes can be varied at will.

In the last stage, the belts 35 abruptly approach the strip 11 moving at the same speed. Assisted by the magnetic force acting on the flakes of opposite polarities coming from the other side, the outer edges of the flakes are pushed from both belts 35 into the slurry on the strip 11. As the belts 35 leave the poles 37, the flakes are left adhering to the strip as a nickel flock, compacted to the extent predetermined by the setting of the flocking machine.

In the present embodiment, there are about 500 rows of flakes per inch of the .0004" flakes and the flake distribution on both sides is nearly uniform.

The nickel flock obtained in this manner is then dried and sintered in conventional manner which provides conducting nickel bonds as above described, with the flake edges in electrical contact with the supporting carrier strip, establishing the above outlined "river and tributaries like" metallic paths from terminal, to carrier strip, to flake surface, to active material film, to electrolyte. The sintered strip can be used directly or it can be recycled through an electrolytic bath of nickel nitrate as taught in the Edison Pat. 1,402,751 at high current density for a few seconds to deposit a small additional amount of $Ni(OH)_2$ especially at the roots of the flakes but in small thickness on their surfaces too. On drying and resintering this strengthens the bond to the tensile strength of the flakes themselves and greatly increases the effective surface of the flakes. An alternate method of strengthening is to deposit a thin film of electroless nickel and resintering it.

The sintered flocked plate can then be impregnated, electrolyzed, charged and discharged in conventional manner but cathodic deposition of the active material is the preferred method (Edison Pat. No. 1,402,751). Because of the exceptionally good access to limited electrolyte, the plates can have a 50% fill, and at such 50% fill the film of active material, e.g. $Ni(OH)_2$ is 10 to $12\mu$ thick whereas the electrolyte film in which it is immersed is 20 to $24\mu$ thick.

As above mentioned, over 30 ampere hours or over 36 watt hours per pound can be obtained in sealed nickel cadmium cells of this type. The porosity of the flakes is about 96.7%, the flake volume being 3.3% nickel, as against the conventional .003" grid with 80% porosity and a metallic volume of 24%. With the positive control according to the above described flocking technique, of the components that make up the internal cell terminal resistance, this resistance totals, for a "D" cell of conventional dimensions, to about .0016 ohm so that a short circuit current of 750 amperes is possible at 1.2 cell voltage.

In accordance with another embodiment of the invention, the "river and tributaries" configuration described above with reference to FIGS. 3, 4 and 8 can be obtained by means of a weaving technique somewhat analogous to the manufacture of terry cloth. This embodiment will now be described with reference to FIG. 9.

FIG. 9 shows, in exaggerated scale, a supporting warp 51 with supporting weft 52 both of nickel filaments or slivers about .002" thick, of a commercially available type such as for example described in the 1965 "Progress Report" of Brunswick Corporation. At 55 are indicated "terry cloth" loops of similar filament material having an approximate total length, between opposite bends, of about $\frac{1}{16}$", and 5 to $8\mu$ in diameter. The crosses 57 indicate needles used during weaving as temporary weft, and later withdrawn. The width of the web 51, 52, 55 corresponds to that of the above described flaked nickel strip 11. The loops can be left uncut, or sheared to provide open end filaments. At any rate, the woven ribbon is preferably fluffed after the needles 57 have been retracted. The fluffing can be performed by mechanical agitation in a powerful magnetic field which causes divergence of the individual fiber loops or filaments. It will be evident that the electrolytically active fibers or slivers 55 are in good conductive contact with the supporting web structure 51, 52 which in its turn can easily be provided with suitable terminals.

It should be understood that the present disclosure is for the purpose of illustration only and that this invention includes the flocked plate and all modifications and equivalents which fall within the scope of the appended claims.

I claim:

1. A battery plate comprising:
    conductive carrier means with highly conductive terminal means;
    flock means with optimally large metallic surfaces oriented effectively parallel to each other and normal to the carrier means, at predetermined distances from each other; and
    optimally thin films of active battery material on one side in electrical and mechanical contact with the flock surfaces and on the other side accessible for immersion in electrolyte;
    said flock means constructed and arranged on said carrier means to establish a predetermined river and tributary pattern of metallic divergence from terminal means to carrier means to flock surfaces to active material films for interaction at opposite surfaces with the electrolyte.

2. Plate according to claim 1 wherein said flock comprises flat nickel platelets.

3. Plate according to claim 2 wherein said platelets measure approximately $\frac{1}{32}$" x $\frac{1}{32}$" and are 0.00004" thick.

4. Plate according to claim 1 wherein said flock means comprises nickel fibers.

5. Plate according to claim 1 wherein said flock means comprises pliable metal fiber on a woven metal fabric constituting said carrier means.

6. Plate according to claim 5 wherein said fiber is approximately $8\mu$ thick.

7. Plate according to claim 5 wherein said carrier means comprises metallic warp and weft strands of a ribbon web, and said fiber comprises metal strands woven into and supported by said web.

8. A flocked plate for electric batteries comprising:
    a supporting conductive sheet;
    a multiplicity of approximately flat flakes each having at least one substantially straight joining edge, the flakes being stacked approximately normal on a surface of said sheet with said joining edges approximately aligned on said surface, at optimal distances from each other; and
    means for conductively and mechanically connecting said joining edges to said surface;
    said flocked plate having an optimal porosity and conductivity and constructed and arranged to establish an inherent main and tributary stream configuration.

9. Plate according to claim 8 wherein said distances are partly defined by the location of said joining edges on said surface.

10. Plate according to claim 8, wherein said distances are partly defined by accidental deviations from flake flatness and from alignment and normal stacking on said surface.

11. Plate according to claim 8 wherein said sheet has the form of a nickel strip and said flakes have nickel faces.

12. Plate according to claim 8 wherein said flakes are essentially smooth.

13. Plate according to claim 8 wherein said flakes are crimped.

14. Plate according to claim 8 wherein said flakes include an iron core and a layer of nickel on each side of the core.

15. Plate according to claim 8 wherein said connecting means includes a fillet of sintered nickel.

16. Plate according to claim 8 wherein said flakes are square, one of the four edges of each flake constituting said joining edge.

17. A flocked strip electrode for alkaline electric batteries comprising:
  a supporting nickel strip;
  a multiplicity of substantially square, flat nickel flakes closely bonded essentially normal on both surfaces of the strip with a supporting edge of each flake adjacent a respective surface and essentially transverse to the width of the strip, essentially regular spaces between the flakes being provided by predetermined spacing of said edges;
  and sintered nickel fillets at said supporting edges for conductively joining the flakes to the strip.

18. Electrode according to claim 17, wherein said spaces between the flakes are codetermined by accidental deviations from said essentially normal and transverse flaking.

19. Electrode according to claim 17 wherein said spaces between the flakes are codetermined by accidental deviation from flatness of the flakes.

References Cited

UNITED STATES PATENTS

| | | | |
|---|---|---|---|
| 3,033,909 | 5/1962 | Urry | 136—120 |
| 3,262,815 | 7/1966 | Langer et al. | 136—36 |
| 3,266,936 | 8/1966 | Krebs | 136—36 |
| 3,288,663 | 11/1966 | Webb et al. | 161—62 |
| 3,502,207 | 3/1970 | Alexander | 161—64 |

ALLEN B. CURTIS, Primary Examiner

C. F. LE FEVOUR, Assistant Examiner

U.S. Cl. X.R.

29—191.2; 136—36, 120